United States Patent
Maier et al.

(10) Patent No.: US 12,547,596 B2
(45) Date of Patent: Feb. 10, 2026

(54) DETECT DATA STANDARDIZATION GAPS

(71) Applicant: INTERNATIONAL BUSINESS MACHINES CORPORATION, Armonk, NY (US)

(72) Inventors: Albert Maier, Tuebingen (DE); Dennis Butterstein, Stuttgart (DE); Alexandre Luz Xavier Da Costa, Stuttgart (DE); Mike W. Grasselt, Leinfelden-Echterdingen (DE); Timo Kussmaul, Boeblingen (DE); Yevgen Karpenko, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/643,906

(22) Filed: Dec. 13, 2021

(65) Prior Publication Data

US 2023/0185786 A1    Jun. 15, 2023

(51) Int. Cl.
  *G06F 16/21* (2019.01)
  *G06F 16/22* (2019.01)
  *G06F 16/25* (2019.01)

(52) U.S. Cl.
  CPC .......... *G06F 16/219* (2019.01); *G06F 16/221* (2019.01); *G06F 16/254* (2019.01)

(58) Field of Classification Search
  CPC .... G06F 16/219; G06F 16/221; G06F 16/254; G06F 16/215; G06F 16/2474; G06F 16/2477
  See application file for complete search history.

(56) References Cited

U.S. PATENT DOCUMENTS 7,305,419 B1    12/2007  Cosby
7,702,618 B1 *   4/2010  Patterson .............. G06F 16/219
                                                 707/999.003

(Continued)

FOREIGN PATENT DOCUMENTS

CN    101136020 A     3/2008
CN    102214243 A    10/2011
WO    2023/111781 A1  6/2023

OTHER PUBLICATIONS

Author Unknown, "Define a comparison set for reference model change detection," Tekla User Assistance | Software version: 2020, Mar. 10, 2020, https://teklastructures.support.tekla.com/2020/en/int_comparison_sets_in_reference_model, 6 pages.

(Continued)

*Primary Examiner* — Vaishali Shah
(74) *Attorney, Agent, or Firm* — Anthony M. Pallone

(57) ABSTRACT

A computer-implemented method for detecting reference data standardization gaps in data sets is disclosed. The method comprises identifying at least one reference data candidate in a data set, using an index for values of the identified at least one reference data candidate, and determining a difference between an earlier version of a reference data set relating to the reference data candidate and a current version of the reference data set. Furthermore, the method comprises comparing the determined difference with values of the index, and identifying entries in the at least one reference data candidate having a value identical to a value of the difference as reference data standardization gap.

14 Claims, 6 Drawing Sheets

(56) References Cited

U.S. PATENT DOCUMENTS

| | | | |
|---|---|---|---|
| 9,886,446 B1* | 2/2018 | Liu | G06F 16/1748 |
| 10,122,577 B1* | 11/2018 | Rykowski | G06F 40/174 |
| 10,545,978 B1* | 1/2020 | Marschner | G06F 16/252 |
| 10,649,983 B1* | 5/2020 | Lequeux | G06F 16/24 |
| 10,777,303 B2* | 9/2020 | Majumdar | G06T 11/206 |
| 11,301,631 B1* | 4/2022 | Atallah | G06F 40/103 |
| 2002/0022953 A1* | 2/2002 | Bertolus | G06F 40/126 |
| | | | 707/E17.058 |
| 2005/0080776 A1* | 4/2005 | Colledge | G06F 40/247 |
| 2006/0233325 A1* | 10/2006 | Wu | G06F 40/242 |
| | | | 704/E15.045 |
| 2007/0118514 A1* | 5/2007 | Mariappan | G06F 16/951 |
| 2010/0174720 A1* | 7/2010 | Mack | G06F 16/22 |
| | | | 707/812 |
| 2013/0173541 A1* | 7/2013 | Iyer | G06F 16/213 |
| | | | 707/625 |
| 2014/0279972 A1 | 9/2014 | Singh | |
| 2016/0364434 A1* | 12/2016 | Spitz | G06F 16/248 |
| 2017/0123630 A1* | 5/2017 | Yamauchi | G06F 3/0482 |
| 2017/0140015 A1 | 5/2017 | Rangadass | |
| 2018/0053115 A1* | 2/2018 | Vachhani | G06Q 30/0204 |
| 2019/0220230 A1* | 7/2019 | Khan | G06F 12/0207 |
| 2019/0294719 A1* | 9/2019 | Beringer | G06F 16/2465 |
| 2019/0392001 A1* | 12/2019 | Carothers | G06N 3/049 |
| 2020/0097846 A1* | 3/2020 | Muramoto | G06N 99/00 |
| 2020/0233863 A1* | 7/2020 | King | G06F 16/9536 |
| 2020/0342036 A1* | 10/2020 | Fowlkes | G06N 7/01 |
| 2020/0380973 A1* | 12/2020 | Novitchenko | G06F 40/35 |
| 2021/0034614 A1* | 2/2021 | Kothari | G06F 16/2264 |
| 2021/0149933 A1* | 5/2021 | Chang | G06F 16/35 |
| 2021/0241035 A1* | 8/2021 | Sutherland | G06V 10/7784 |
| 2021/0286780 A1* | 9/2021 | Harale | G06N 5/04 |
| 2021/0326311 A1* | 10/2021 | Ker | G06F 16/215 |
| 2021/0382915 A1* | 12/2021 | Qian | G06F 16/275 |
| 2022/0067006 A1* | 3/2022 | Padinker | G06F 16/215 |
| 2022/0284901 A1* | 9/2022 | Novitchenko | G10L 15/22 |
| 2022/0309390 A1* | 9/2022 | Arnautov | G06F 18/10 |

OTHER PUBLICATIONS

Author Unknown, "How to Manage Reference Data," Informatica, 2019, https://www.informatica.com/content/dam/informatica-com/en/collateral/white-paper/how-to-manage-reference-data_white-paper_3641en.pdf, 10 pages.

Author Unknown, "How to: Use a Reference Dataset to Standardize Column Values," Trifacta Support, Oct. 12, 2020, https://community.trifacta.com/s/how-to-use-a-reference-dataset-to-standardize, 2 pages.

Disclosed Anonymously, "Controlling Progression of Reference Data Set Versions," IP.com No. IPCOM000239375D, IP.com Publication Date: Nov. 3, 2014, 5 Pages.

"Patent Cooperation Treaty PCT International Search Report", International Application No. PCT/IB2022/061874, International Filing Date: Dec. 7, 2022, Date of Mailing: Mar. 24, 2023, 8 pages.

* cited by examiner

DETECT DATA STANDARDIZATION GAPS

BACKGROUND

The invention relates generally to a method for detecting reference data standardization gaps, and more specifically, to a computer-implemented method for detecting reference data standardization gaps in data sets. The invention relates further to a reference data management system for detecting reference data standardization gaps in a data set, and a computer program product.

Managing the ever-growing amount of data remains a key challenge for information technology (IT) organizations. In order to remain technically successful, data management groups focus more and more on data quality to build a proper basis for initiatives supported by machine-learning techniques. Reference data play a key role in successful data management approaches. Thereby, reference data should be understood as a special subset of master data, wherein master data are typically used to categorize and organize operational data. Examples of reference data can be country codes, postal codes, account types, financial hierarchies, product number, supplier identifiers and much more.

Reference data may typically change slowly, however, changes happen. As an illustrative example, countries might be united, such as the Federal Republic of Germany and the former German Democratic Republic or, they are split like Czechoslovakia into the Czech Republic and Slovakia. It is very important for companies to standardize on certain versions of reference data sets, e.g., to be able to aggregate data from different locations into useful business content. However, even companies investing heavily into good reference data management, typically have areas in which reference data has not yet been standardized, e.g., certain business units may not have been part of the reference data management because the company was taken over. As such, these areas may represent a standardization gap. In such cases, it is important to quickly identify standardization gaps and start closing those gaps.

Thereby, standardization gaps do not mean that the reference data are not consistent or standardized, but that operational data that should be compliant with reference data do not use the current version of the reference data.

Currently, a typical approach to tackle the above-mentioned problem may rely on data management experts that are supposed to know the data and how it should be represented. However, this is a labor-intensive approach that is costly and quite error prone.

On the other side, profiling data with data classification tools against the current set of reference data sets does not complete the request either. Large enterprises often have thousands of reference data sets and some of them could be very large; e.g., it is not unusual to have a reference data set with tens of thousands of reference data values. When using such reference data sets in data profiling projects, a lot of computing resources may be required, especially, when the full set of data records is required to catch all standardization issues.

Another issue with this technology is that the result may represent just a confidence whether a column comprises data from one of the most recent definitions of a selected reference data set. However, such a process does not help to decide that an older version of the reference data set has been used or even if the process considered all variants of the reference data set. It simply cannot distinguish between outdated values and other data quality issues.

There are several disclosures related to data profiling. Document US2017/0140 015 A1 discloses a system for centrally managing core enterprise reference data associated with an enterprise. A centralized master repository contains the core enterprise reference data. The internal services framework provides internal services for managing the core enterprise reference data within the centralized master repository.

Additionally, document U.S. Pat. No. 7,305,414 B1 discloses systems and methods of managing hierarchical reference data. According to one embodiment, a hierarchical data management program can maintain a master set of reference data corresponding to the reference data being managed. From the master set of reference data, the hierarchy management program can instantiate centralized hierarchies, validate changes to the centralized hierarchies and enforce business rules with respect to the centralized hierarchies.

Nonetheless, a disadvantage of known solutions may be that always only a portion of the data quality problems may be addressed. Hence, there may be a need to overcome limitations of the current approaches and provide a solution to identify reference data standardization gaps.

SUMMARY

According to one aspect of the present invention, a computer-implemented method for detecting reference data standardization gaps in data sets may be provided. The method may include identifying at least one reference data candidate in a data set, using an index for values of the identified at least one reference data candidate, and determining a difference between an earlier version of a reference data set relating to the reference data candidate and a current version of the reference data set. Additionally, the method may include comparing the determined difference with values of the index, and identifying entries in the at least one reference data candidate having a value identical to a value of the difference as a reference data standardization gap.

According to another aspect of the present invention, a reference data management system for detecting reference data standardization gaps in a data set may be provided. The system may include a processor and a memory, communicatively coupled to the processor. The memory stores program code portions that, when executed, enable the processor to identify at least one reference data candidate in a data set, use an index for values of the identified at least one reference data candidate, determine a difference between an earlier version of a reference data set relating to the reference data candidate and a current version of the reference data set, compare the determined difference with values of the index, and identify entries in the at least one reference data candidate having a value identical to a value of the difference as a reference data standardization gap.

The proposed computer-implemented method for detecting reference data standardization gaps in data sets may offer multiple advantages, technical effects, contributions and/or improvements:

The inventive solution may identify reference data standardization gaps—in particular, in operational data—much more efficient than with already known technologies. Thereby, a lot of time may be saved if compared to human-based approaches; additionally, computational resources may be saved.

The proposed concept may be based on a set of core principles. Firstly (i), the investigation space on the source system side may be reduced by identifying all candidates for fields and/or columns that potentially contain reference data. Thereby, the focus may be on a quick filtering where precision may play only a second role. Secondly (ii), if it does not already exist, an inverted index is built which may later be used for an efficient existence check. Thirdly (iii), possible values that may contribute to the standardization gap may be determined. Thereby, it is worthwhile mentioning that this list is typically very small; it is smaller than the list of all reference data values. This may be instrumental to save computing resources in identifying the standardization gaps. Finally (iv), false positives are eliminated after the gap values and an inverted index has been used to identify columns with standardization gaps. The false positives may have been introduced by reducing the scope of the investigation initially to the small list of gap values.

Overall, a solution may be proposed which does not only allow a comparison with a current reference data set, but which may also take earlier reference data sets into account. This may also be instrumental for imported master data (e.g., product, customer, supplier, and employee data), but may often also be used in transactional data (i.e., structured data).

In the following, additional embodiments of the inventive concept—applicable for the method as well as for the system—will be described.

According to one embodiment of the method, the determining a difference—in particular, between an earlier version of a reference data set relating to the reference data candidate—may also include determining a difference between more than one earlier version of the reference data set relating to the reference data candidate (e.g., the current version of reference data as well as older ones may be involved). However, it may also be possible to only focus on two older versions than the current version. For that, the more recent version of the reference data may be used as current reference data set. This flexibility may allow handling data standardization in a much more efficient way for IT operators and data quality managers.

According to a further developed embodiment, the method may further include eliminating a false positive (candidate) from a plurality of reference data candidates which may have been identified having issues regarding data standardization. Thereby, it is worthwhile mentioning that the elimination is directed to the group of reference data candidates, i.e., in the relational model: gap candidate columns. Thereby, it is not necessary to go down to the level of the actual values which may comprise millions and millions of data fields (e.g., false sales transactions worldwide).

However, the objective of the proposed concept is the identification of columns of data which may comprise data not relating to reference data although they should be selected from related reference data values. In such a case, typically the data owner may be informed. He may then be responsible to take adequate actions to increase the data quality. This may include changes to user interfaces and proposed input field values. For example, after the reunification of the Federal Republic of Germany (FRG) or Western Germany and the German Democratic Republic (GDR or DDR), many applications only refer to Germany as proper reference data. Hence, user interfaces should no longer propose the historic names of the two former parts of Germany. Furthermore, other abbreviations like DDR3 or DDR4 (which may relate to memory chip architectures) may be found in columns of data. However, such data should not be intermixed with the former state name because they may belong to a completely different domain. Therefore, such columns may be eliminated from the group relating to the reference data type countries. If on the other hand, other entries in the column in question includes only country names like Netherlands, France, Austria, Mexico and so on, it becomes clear that the column needs to be highlighted if the term "DDR" is mentioned.

According to an enhanced embodiment, the method may further include running a full comparison between entries (i.e., its values) of the at least one reference data candidate and the earlier version of a reference data set, and identifying all entries of the reference data candidate (i.e., typically, columns in the relational data model) matching outdated entries in the earlier version of a reference data set as reference data standardization gap (of the entries in the reference data candidate). Performing the full comparison may of course involve more computing resources; however, the reference data or the verification of the standardization gap may become more accurate.

According to one optional embodiment, the method may further include using a user-defined data quality threshold value for a false positive determination, in particular, for the number of detected reference data candidates. Hence, a data standardization gap alarm may therefore only be issued if a certain number of entries in the reference data candidates do not relate to the selected version of the reference data set. Therefore, a small number of entries that do not conform to the selected reference data set may be tolerated.

According to an even more enhanced embodiment of the method, the user-defined data quality threshold value may be specified for only a group of data sets, i.e., reference data candidates. Consequently, the data quality threshold value may not be applied to a global level of supervised data, but may be applied to only a predefined, user-specified subset. This may allow data managers a more fine-grained control of reference data standardization gaps.

According to another interesting embodiment of the method, the data set may be selected out of the group including a table of a database—in particular, a relational database, a row-oriented database, a column-oriented database, and so on—a comma-separated-value file, and fields in files. In general, the proposed concept may be data organization and storage concept agnostic. Hence, every data organization architecture may be used and supported by the here proposed inventive concept.

According to a useful embodiment, the method may also include, upon the index not existing, building the index. The index entries may be differentiated by different values of the identified at least one reference data candidate, and each index entry may include all identifiers for the at least one reference data candidate. Often such an index exists already; these may then be used directly which may further reduce the required computation resources for implementing the inventive concept.

According to a further permissive embodiment, the method may also include maintaining the index for a predetermined period of time. It may then be used for future data standardization tasks and may not need to be rebuilt.

According to an advantageous embodiment of the method, a regular index—i.e., not an inverted index—may be used to determine a list of all values stored in a column and to compare them against the reference data. This may help to decrease the time for finding false positives and thus improve the data quality.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject matter, also any combination between features relating to different subject matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments, to which the invention is not limited.

Figure 1:
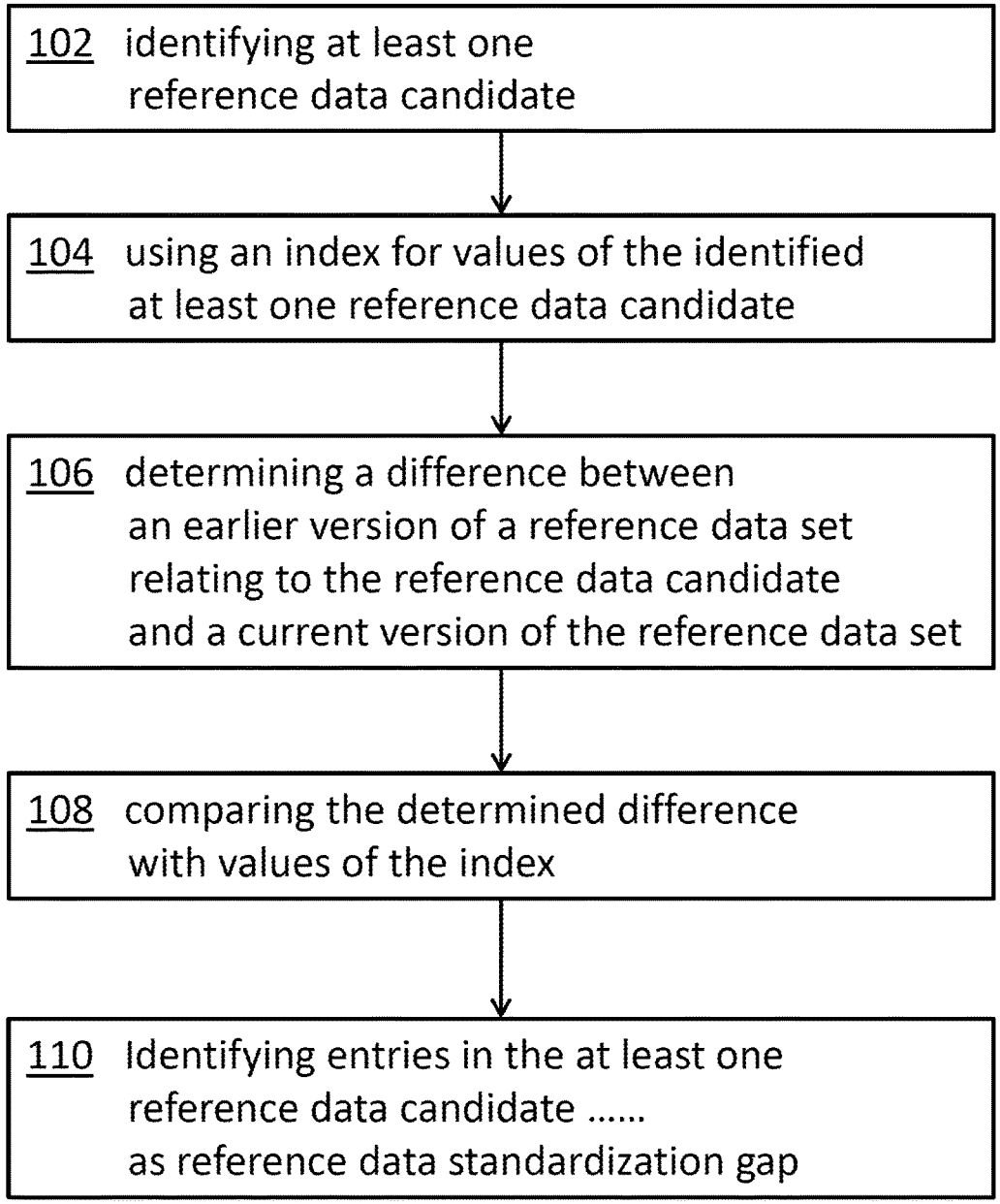

Preferred embodiments of the invention will be described, by way of example only, and with reference to the following drawings:

FIG. 1 shows a block diagram of the inventive computer-implemented method for detecting reference data standardization gaps in data sets, according to at least one embodiment.

Figure 2:
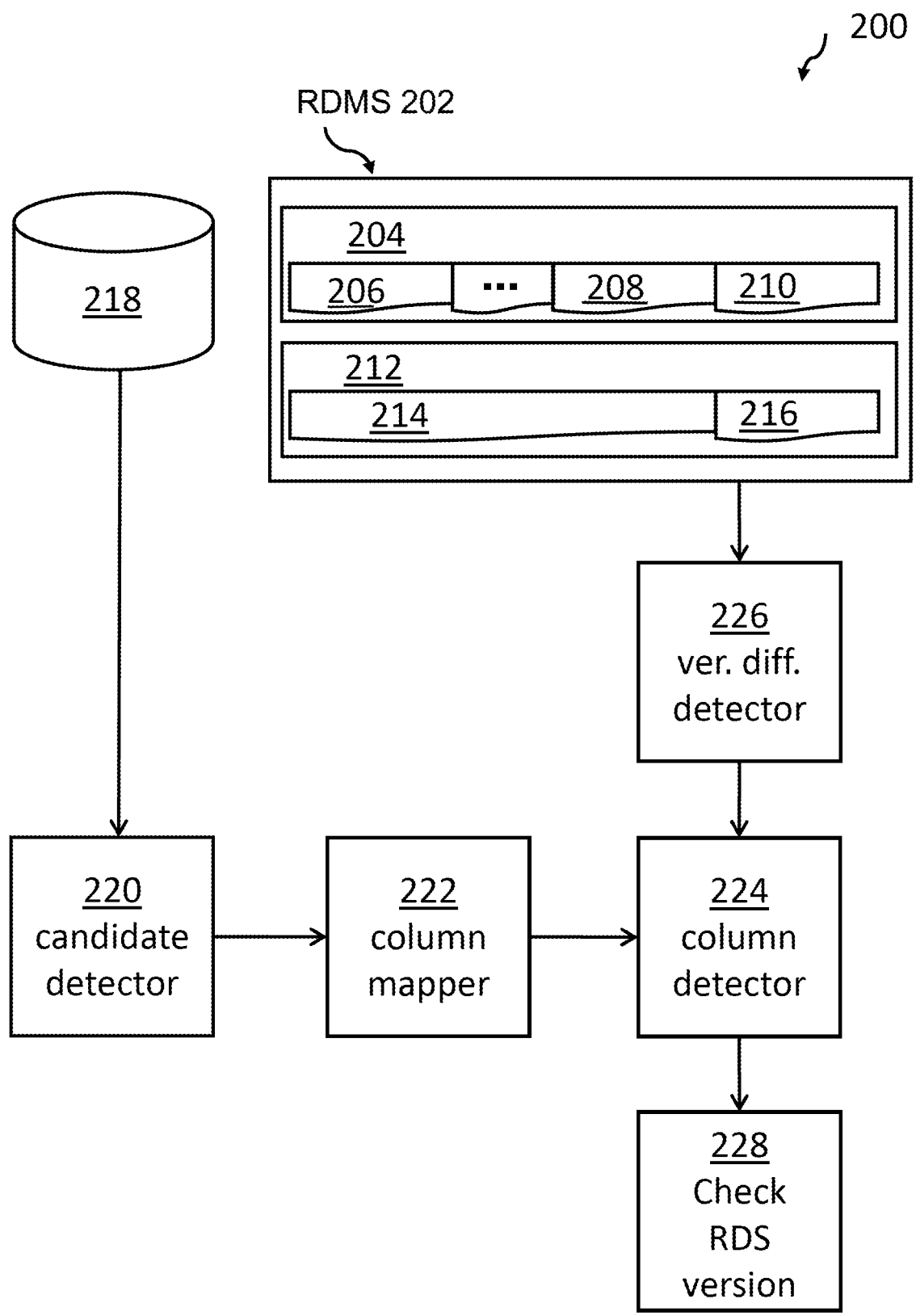

FIG. 2 shows a block diagram of functional units and their relationships, according to at least one embodiment.

Figure 3:
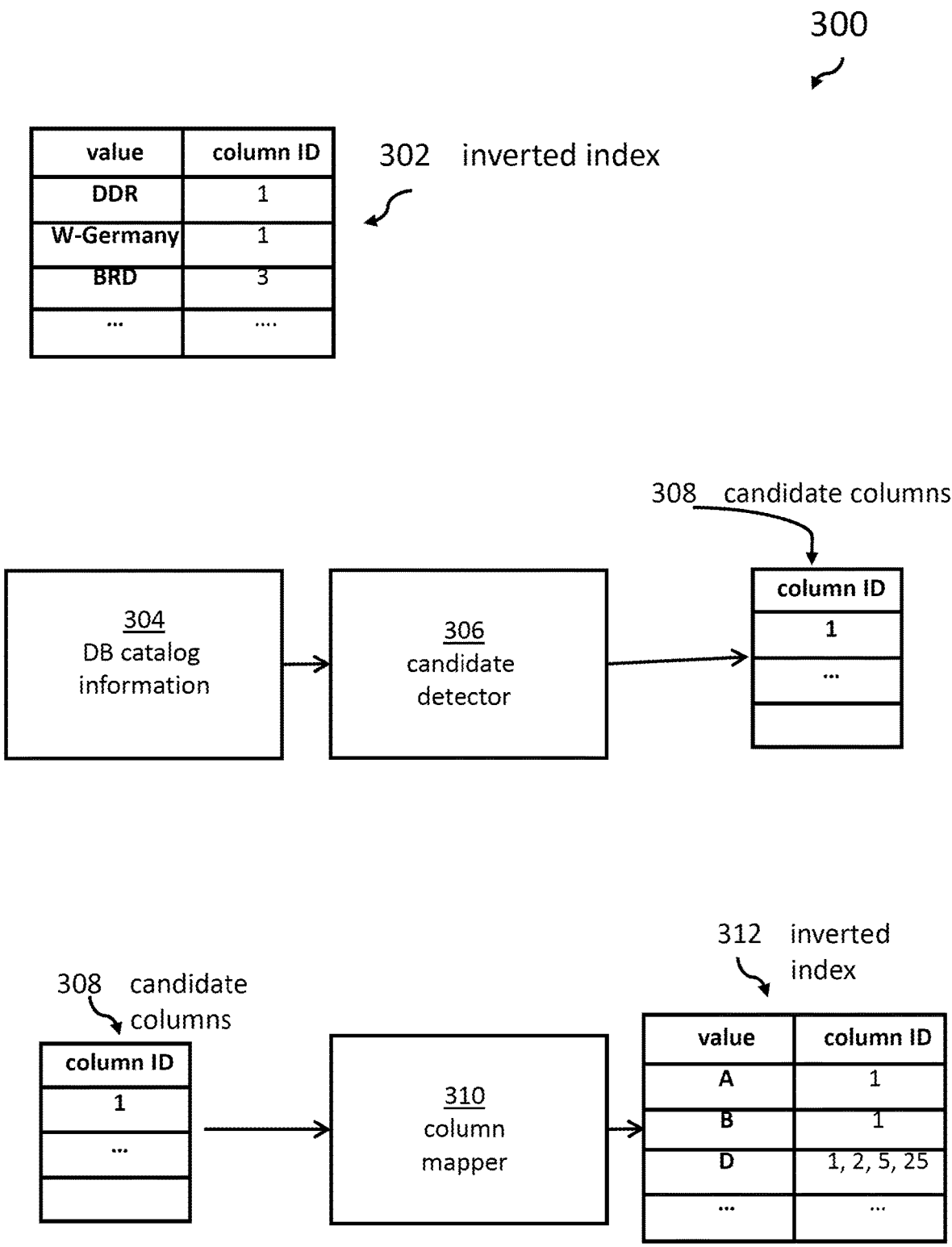

FIG. 3 shows a first part of a block diagram of a how the functional units relate to various data involved in the method, according to at least one embodiment.

Figure 4:
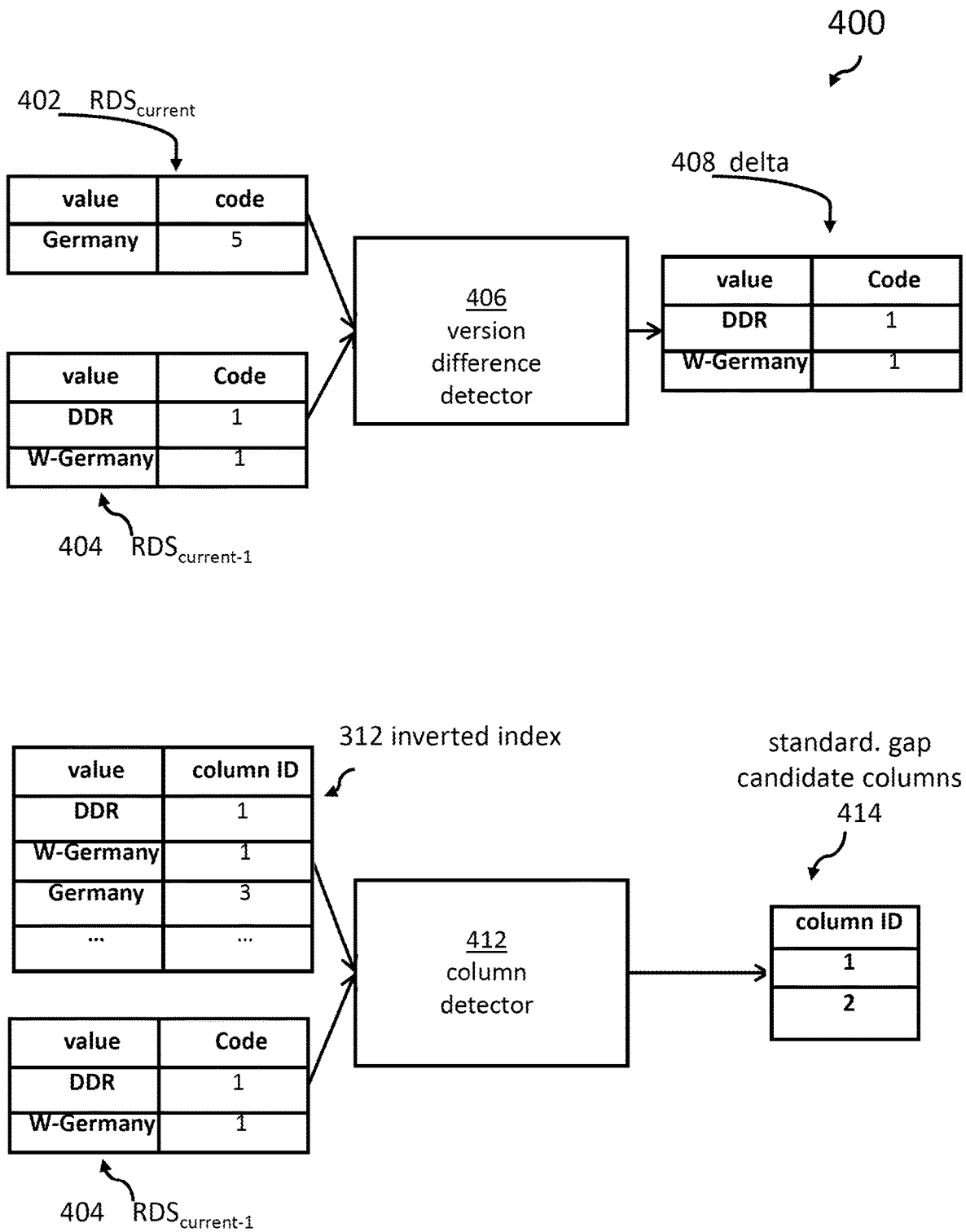

FIG. 4 shows a second part of a block diagram of a how the functional units relate to various data involved in the method, according to at least one embodiment.

Figure 5:
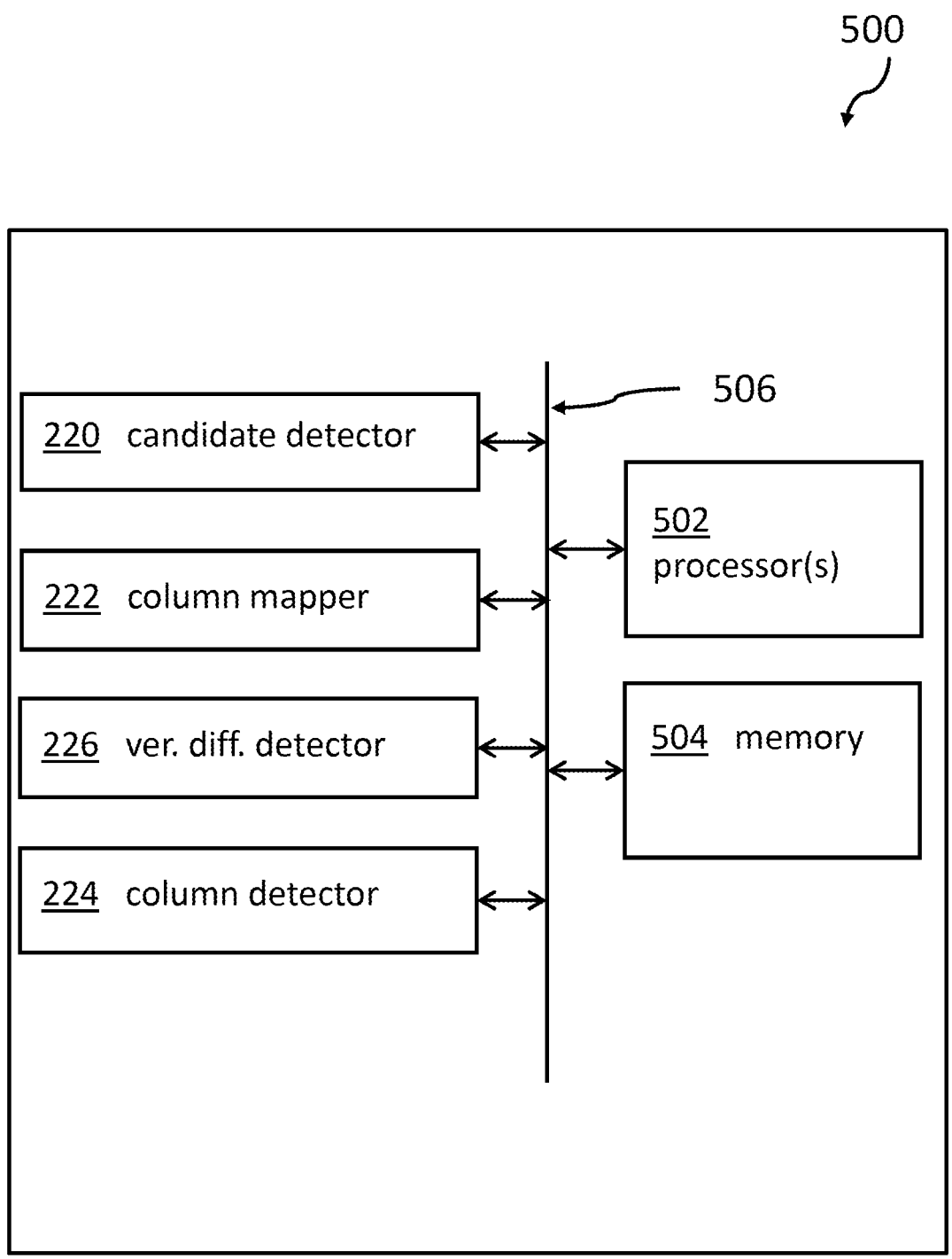

FIG. 5 shows a block diagram of the inventive reference data management system for detecting reference data standardization gaps in a data set, according to at least one embodiment.

Figure 6:
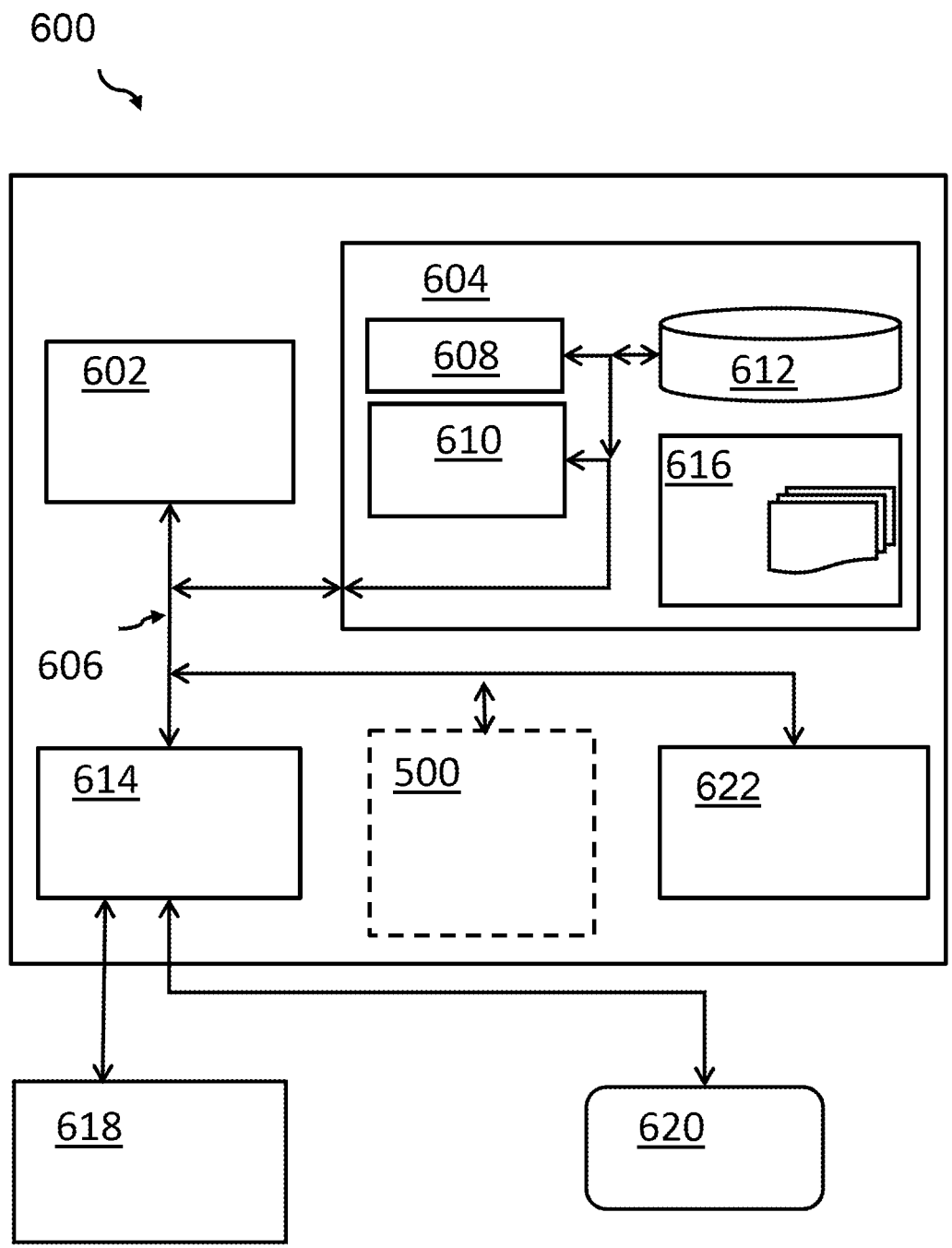

FIG. 6 shows a computing system comprising the system according to FIG. 5, according to at least one embodiment.

DETAILED DESCRIPTION

In the context of this description, the following conventions, terms and/or expressions may be used:

The term 'reference data standardization gap' may denote the fact that in operational data values of a related reference data set may not have been used correctly. In fact, reference data may be used as entries for the operational data—however, an old version of the related reference data may have been used. This may represent an issue for the data quality of the operational data which may have to be dealt with in order to close the referent data standardization gap. An alternative and eventually a more general expression for the term 'reference data standardization gap' may be a 'non-compliance of values of a first related group of data values to predefined reference data values of a second group of data' (i.e., the reference data). Thereby, the first related group of data values may represent operational data in a column of a data table in a relational data model.

The term 'data set' may denote a table or any other form of organized data. Furthermore, the data set may also relate to a plurality of tables, e.g., reference data tables or tables of operational data. Instead of organizing data in tables with columns and rows—i.e., the relational data model—also other data and storage organization models may be used. An example may be a reference data set which may include different allowed values at different points in time.

The term 'reference data candidate' may denote here a column of a larger set of data (if the relational model is assumed).

The term 'index', or better 'inverted index', may denote here a table comprising values and their occurrences in columns. The nature of this index—i.e., value to column mapping—may be exploited when asking the question, in which columns does this reference difference value exist.

The term 'earlier version' may denote—in particular, of a reference data set—a version of the reference data set that was valid in an earlier time if compared to the current version of the reference data said.

The term 'false positive' may denote here reference data candidates that may be identified as representing issues in respect to reference data standardization gaps.

The term 'reference data management system' may denote a system and an underlying method used to maintain reference data for, e.g., operational or other technical data. Thereby, reference data define an allowed set of values to be used for a given domain. Simple examples may include ZIP codes, country names, streets in the city, counties, geographical regions, but also product names, product numbers, supply identifiers, allowed currencies, car types, and so on, and so on.

In the following, a detailed description of the figures will be given. All instructions in the figures are schematic. Firstly, a block diagram of an embodiment of the inventive computer-implemented method for detecting reference data standardization gaps in data sets is given. Afterwards, further embodiments, as well as embodiments of the reference data management system for detecting reference data standardization gaps in a data set will be described.

FIG. 1 shows a block diagram of a preferred embodiment of the computer-implemented method 100 for detecting reference data standardization gaps in data sets. This allows the method to be applied to only one column—or, more generally to a data reference candidate—but in practical example cases, the method may be applied to a larger number of data reference candidates, i.e., to potential columns in the relational model.

The method includes identifying, 102, at least one—but typically more—reference data candidate—i.e., a column or more columns in the relational model—in a data set. For this activity, standard known technology may be used.

The method 100 further includes using, 104—or building if not existent—an index—in particular at word or phrase level for values of the identified at least one reference data candidate. In general, all values of the identified columns of the data sets, i.e., a plurality of columns relating to a plurality of tables are addressed. The table (in the relational model) as ordering schema can be seen as irrelevant here. All columns are handled identically.

Additionally, the method 100 includes determining, 106, a difference between an earlier version of a reference data set relating to the reference data candidate and a current version of the reference data set. Such difference would only be a comparably small amount of data which may be used as further source for additional comparisons.

As further steps, the method 100 includes comparing, 108, the determined difference—in particular, between two versions of a reference data set—with values of the index—in particular of the at least one identified reference data candidate, and identifying, 110, entries in the at least one reference data candidate having a value identical to a value of the difference as reference data standardization gap. Thus, columns (and the relational model) are identified in which there are increases that are not related to the associated reference data.

FIG. 2 shows a block diagram 200 of an embodiment of functional units and their relationships. As a source for reference data, a reference data management system (RDMS) 202 can be used. The RDMS can store a plurality of different reference data sets 204. One example for the reference data sets 204 may be a list of countries. For example, the most recent reference data set may be designated with reference numeral 210. The directly predecessor version may be denoted as 208, whereas also other earlier reference data sets 204, 206 can be maintained.

In general, the units of measurement 212, which may represent any type of reference data in a current version 216 and an earlier version 214, can be assumed as the underlying data structure for reference data for the concept proposed here.

On the other side, metadata of a database catalog 218 of the operational data (not shown) to be investigated regarding the reference data standardization gap are used. A candidate detector 220 may identify reference data candidates (typically, columns in the relational model) in which reference data should be used correctly. The column mapper 222 can be instrumental to generate an inverted index of the reference data used in different columns (more details are shown in the next figures). However, also existing inverted indexes can be used.

Furthermore, the version difference detector 226 determines a comparably small amount of data representing the difference of the reference data of two different versions, i.e., from two different points in time. Furthermore, by way of comparing the output of the version difference detector 266 and the output of the column mapper 222, the column detector 224 identifies those reference data candidates in which reference data standardization issues, i.e., reference data standardization gaps exist. As an optional functional unit, the check RDS (reference data set) version 228 may be used to identify false positives of the output of the column detector 224.

FIG. 3 shows a first part 300 of a block diagram of an embodiment of how the functional units relate to various data involved in the method. To start with, the table of an inverted index 302 is shown. Again, the example of the country list as reference data is used here. Only three countries—out of about 200 to 250 possible ones in total—are explicitly named in the left column. The right column shows column IDs of tables (using the relational model) that represent reference data candidates, i.e., column 1, and column 3. It can be assumed that all columns of all tables are treated equally, and the tables as organizational instruments do not play a role here. Thus, the term "DDR" and the term "W-Germany" (West Germany) is mentioned in the column with the ID "1" and the term "BRD" is found in the column with the ID "3".

In the following, the relational model is assumed. I.e., the following examples are described in the context of the relational model with tables and rows. As already mentioned above, also other data organization models may be used as an underlying data organization and storage method.

In the first step of the method, reference data candidates are identified with existing and known technology using the database catalog information 304—in particular, its metadata—together with the candidate detector 306. One existing method is to piggyback profiling results such as frequency distribution, data types, length of character columns, and determine columns that are encoded with a set of enumerated values that is relatively small compared to the total number of values. The result of this step would be a list with candidate columns 308, i.e., the data reference candidates.

In a second step of the method, an inverted index 312 for the reference data candidate columns is built if not already existent. For this, the candidate columns 308 are used as input by the column mapper 310 (compare FIG. 2, 222; this may also apply to other functional units used in the FIGS. 2, 3 and 4) which then outputs the inverted index 312. I.e., for each of these columns one determines the distinct values and for each of these values an entry <value, column-ID> is added to the inverted index. If a column "country" with the ID "100" has three distinct values "Germany", "France", "Italy", one would store these tuples into the inverted index. Depending on the technology to implement the inverted index, there might be additional details to care about (not further detailed here). As an example: If relational technology is used, there would be one table per reference data "basic type" that the RDM system supports, e.g., if the IBM system is three basic types, i.e., number, string, date, three index tables would be useful and the source to system types would be mapped to the RDM basic types.

FIG. 4 shows a second part 400 of a block diagram of an embodiment of a how the functional units relate to different data involved in the method. Here, shown in the upper part of FIG. 4, the version difference detector 406 determines the difference (or delta) between different versions of the underlying reference data set. Thereby, it is assumed that for each reference data set (RDS) at least, and $RDS_{current}$ 402 and the previous version $RDS_{current-1}$ 404 are managed by the RGMS. The delta 408 (or delta table) holds on values from the $RDS_{current-1}$ if they are not part of the newer version $RDS_{current}$.

Then—as described by the lower diagram portion of FIG. 4—standardization gap candidate columns 414 are determined by the column detector 412. It uses the output of the version difference detector 406, namely, the delta 408, as well as the inverted index (compare FIG. 3, 312). Thereby, for each reference data value in the data 408 the entry of the inverted index is used to determine the columns in which it occurs ("select all column-IDs from inverted index, where value is in the delta"). The method could end here and use the determined list as the one in which data reference standardization gaps exist.

However, there may also be the step of eliminating false positives from the standardization gap candidate columns. For each of the columns in data 408, a full check can be run whether distinct values in the columns are coded with the values from $RDS_{current-1}$. All remaining columns are parted out as standardization issues where a move from $RDS_{current-1}$ to $RDS_{current}$ is necessary. A further embodiment, also a user-defined data quality threshold can be applied to allow columns, that have a non-perfect fit to be reported as potential standardization gap. The state or quality threshold can be defined globally or per system hosting columns.

For completeness reasons, FIG. 5 shows a block diagram of an embodiment of the reference data management system 500 for detecting reference data standardization gaps in a data set. The system 500 comprises a processor 502 and a memory 504, communicatively coupled to the processor 502, wherein the memory 504 stores program code portions that, when executed, enable the processor 502, to identify—in particular, by a candidate detector 220 (compare FIG. 2)—at least one reference data candidate in a data set, and to use, or here, build because it was not existent—in particular, by a column mapper 222—an index for values of the identified at least one reference data candidate.

The processor 502 is also be enabled—when executing the program code portions—to determine—in particular by a version difference detector 226—a difference between an earlier version of a reference data set relating to the reference data candidate and a current version of the reference data set, to compare—in particular, by a column detector 224—the determined difference with values of the index, and to identify entries in the at least one reference data candidate having a value identical to a value of the difference as reference data standardization gap.

It shall also be mentioned that all functional units, modules and functional blocks—in particular the processor 502, the memory 504, the candidate detector 220, the column mapper 222, the version difference detector 510 and the column detector 224—may be communicatively coupled to each other for signal or message exchange in a selected 1:1 manner. Alternatively, the functional units, modules and functional blocks can be linked to a system internal bus system 506 for a selective signal or message exchange.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the reference data management system 500 of FIG. 5 for detecting reference data standardization gaps in a data set may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium(or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider),In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The inventive concept may be summarized by the following clauses:

1. A computer-implemented method for detecting reference data standardization gaps in data sets, the method comprising:
   identifying at least one reference data candidate in a data set,
   using an index for values of the identified at least one reference data candidate,
   determining a difference between an earlier version of a reference data set relating to the reference data candidate and a current version of the reference data set.
   comparing the determined difference with values of the index, and
   identifying entries in the at least one reference data candidate having a value identical to a value of the difference as reference data standardization gap.
2. The method according to clause 1, wherein determining a difference also comprises
   determining a difference between more than one earlier versions of the reference data set relating to the reference data candidate.
3. The method according to clause 1 or 2, further comprising
   eliminating a false positive detected column from a plurality of reference data candidates.
4. The method according to clause 3, further comprising
   running a full comparison between entries of the at least one reference data candidate and the earlier version of a reference data set, and
   identifying all entries of the reference data candidate matching outdated entries in the earlier version of a reference data set as reference data standardization gap.
5. The method according to clause 3, further comprising
   using a user-defined data quality threshold value for a false positive determination.
6. The method according to clause 5, wherein the user-defined data quality threshold value is specified for a group of data sets.
7. The method according to any of the clauses 1 to 6, wherein the data set is selected out of the group comprising a table of a database, a comma-separated value file, and fields in files.
8. The method according to any of the clauses 1 to 7, also comprising
   if the index is not existing, building the index, wherein the index entries are differentiated by different values of the identified at least one reference data candidate, and wherein each index entry comprises all identifiers for the at least one reference data candidate.
9. The method according to any of the clauses 1 to 8, also comprising
   maintaining the index for a predetermined period of time.
10. The method according to clause 3, wherein a regular index is used to determine a list of all values stored in a column and to compare them against the reference data.
11. A reference data management system for detecting reference data standardization gaps in a data set, the system comprising
    a processor and a memory, communicatively coupled to the processor, wherein the memory stores program code portions that, when executed, enable the processor, to
    identify at least one reference data candidate in a data set,
    use an index for values of the identified at least one reference data candidate,
    determine a difference between an earlier version of a reference data set relating to the reference data candidate and a current version of the reference data set,
    compare the determined difference with values of the index, and
    identify entries in the at least one reference data candidate having a value identical to a value of the difference as reference data standardization gap.
12. The reference data management system according to clause 11, wherein determining a difference also comprises
    determining a difference between more than one earlier versions of the reference data set relating to the reference data candidate.

13. The reference data management system according to clause 11 or 12, wherein the processor is further enabled to
    eliminate a false positive detected column from a plurality of reference data candidates.
14. The reference data management system according to clause 13, wherein the processor is further enabled to
    run a full comparison between entries of the at least one reference data candidate and the earlier version of a reference data set, and
    identify all entries of the reference data candidate matching outdated entries in the earlier version of a reference data set as reference data standardization.
15. The reference data management system according to clause 13, wherein the processor is further enabled to
    use a user-defined data quality threshold value for a false positive determination.
16. The reference data management system according to clause 15, wherein the user-defined data quality threshold value is specified for a group of data sets.
17. The reference data management system according to any of the claims 11 to 16, wherein the data set is selected out of the group comprising a table of a database, a comma-separated value file, and fields in files.
18. The reference data management system according to any of the claims 11 to 17, wherein the processor is further enabled to
    if the index is not existing, build the index, wherein the index entries are differentiated by different values of the identified at least one reference data candidate, and wherein each index entry comprises all identifiers for the at least one reference data candidate.
19. The reference data management system according to any of the claims 11 to 18, wherein the processor is further enabled to
    maintaining the index for a predetermined period of time.
20. A computer program product for detecting reference data standardization gaps in a data set, the computer program product comprising a computer readable storage medium having program instructions embodied therewith, the program instructions being executable by one or more computing systems or controllers to cause the one or more computing systems to
    identify at least one reference data candidate in a data set,
    use an index for values of the identified at least one reference data candidate,
    determine a difference between an earlier version of a reference data set relating to the reference data candidate and a current version of the reference data set,
    compare the determined difference with values of the index, and
    identify entries in the at least one reference data candidate having a value identical to a value of the difference as reference data standardization gap.

What is claimed is:

1. A computer-implemented method for detecting reference data standardization gaps in data sets, the method comprising:
    identifying at least one reference data candidate in a data set table, wherein the at least one reference data candidate comprises a column of the data set table;
    building an index, wherein the index comprises a database table, and wherein entries of the index comprise distinct phrase values of the identified at least one reference data candidate and their respective column identifiers;
    determining a first difference between an earlier version of a reference data set relating to the identified at least one reference data candidate and a current version of the reference data set;
    determining a second difference between two earlier versions of the reference data set;
    comparing the determined first difference and the determined second difference with values of the index;
    identifying entries in the identified at least one reference data candidate having a value identical to a value of the first difference or a value of the second difference as a reference data standardization gap;
    applying a user-defined data quality threshold value which specifies a number of false positive determinations that will be tolerated within a plurality of reference data candidates;
    providing a data standardization gap alarm in response to the user-defined data quality threshold value being met; and
    generating one or more proposed changes to user interfaces and input field values relating to the identified entries.

2. The method of claim 1, further comprising:
    eliminating a false positive from the plurality of reference data candidates.

3. The method of claim 1, further comprising:
    running a full comparison between entries of the identified at least one reference data candidate and the earlier version of the reference data set; and
    identifying all entries of the identified at least one reference data candidate matching outdated entries in the earlier version of the reference data set as the reference data standardization gap.

4. The method of claim 1, wherein the user-defined data quality threshold value is specified for a group of data sets.

5. The method of claim 1, wherein the data set is selected from the group consisting of a table of a database, a comma-separated-value file, and fields in files.

6. The method of claim 1, further comprising:
    maintaining the index for a predetermined period of time.

7. The method of claim 1, wherein a regular index is applied to determine a list of all values stored in a column and to compare them against the reference data set.

8. A reference data management system for detecting reference data standardization gaps in a data set, the system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the system is capable of performing a method comprising:
        identifying at least one reference data candidate in a data set table, wherein the at least one reference data candidate comprises a column of the data set table;
        building an index, wherein the index comprises a database table, and wherein entries of the index comprise distinct phrase values of the identified at least one reference data candidate and their respective column identifiers;
        determining a first difference between an earlier version of a reference data set relating to the identified at least one reference data candidate and a current version of the reference data set;
determining a second difference between two earlier versions of the reference data set;
comparing the determined first difference and the determined second difference with values of the index;
identifying entries in the identified at least one reference data candidate having a value identical to a value of the first difference or a value of the second difference as a reference data standardization gap;
applying a user-defined data quality threshold value which specifies a number of false positive determinations that will be tolerated within a plurality of reference data candidates;
providing a data standardization gap alarm in response to the user-defined data quality threshold value being met; and
generating one or more proposed changes to user interfaces and input field values relating to the identified entries.

9. The reference data management system of claim 8, further comprising:
eliminating a false positive from the plurality of reference data candidates.

10. The reference data management system of claim 8, further comprising:
running a full comparison between entries of the identified at least one reference data candidate and the earlier version of the reference data set; and
identifying all entries of the identified at least one reference data candidate matching outdated entries in the earlier version of the reference data set as the reference data standardization gap.

11. The reference data management system of claim 8, wherein the user-defined data quality threshold value is specified for a group of data sets.

12. The reference data management system of claim 8, wherein the data set is selected from the group consisting of a table of a database, a comma-separated-value file, and fields in files.

13. The reference data management system of claim 8, further comprising:
maintaining the index for a predetermined period of time.

14. A computer program product for detecting reference data standardization gaps in a data set, the computer program product comprising:
one or more computer-readable tangible storage media and program instructions stored on at least one of the one or more tangible storage media, the program instructions executable by a processor and capable of performing a method, the method comprising:
identifying at least one reference data candidate in a data set table, wherein the at least one reference data candidate comprises a column of the data set table;
building an index, wherein the index comprises a database table, and wherein entries of the index comprise distinct phrase values of the identified at least one reference data candidate and their respective column identifiers;
determining a first difference between an earlier version of a reference data set relating to the identified at least one reference data candidate and a current version of the reference data set;
determining a second difference between two earlier versions of the reference data set;
comparing the determined first difference and the determined second difference with values of the index;
identifying entries in the identified at least one reference data candidate having a value identical to a value of the first difference or a value of the second difference as a reference data standardization gap;
applying a user-defined data quality threshold value which specifies a number of false positive determinations that will be tolerated within a plurality of reference data candidates;
providing a data standardization gap alarm in response to the user-defined data quality threshold value being met; and
generating one or more proposed changes to user interfaces and input field values relating to the identified entries.

\* \* \* \* \*